US011255513B2

(12) United States Patent
Pedersen et al.

(10) Patent No.: US 11,255,513 B2
(45) Date of Patent: Feb. 22, 2022

(54) ASYMMETRIC ILLUMINATION LENS

(71) Applicant: Danmarks Tekniske Universitet, Kgs. Lyngby (DK)

(72) Inventors: Henrik Chresten Pedersen, Jyllinge (DK); Kenneth Saxskiold-Noerup, Roskilde (DK)

(73) Assignees: NORTHLED ApS, Roskilde (DK); Danmarks Tekniske Universitet, Kgs. Lyngby (DK)

( * ) Notice: Subject to any disclaimer, the term of this patent is extended or adjusted under 35 U.S.C. 154(b) by 217 days.

(21) Appl. No.: 16/493,134

(22) PCT Filed: Mar. 15, 2018

(86) PCT No.: PCT/EP2018/056503
§ 371 (c)(1),
(2) Date: Sep. 11, 2019

(87) PCT Pub. No.: WO2018/167202
PCT Pub. Date: Sep. 20, 2018

(65) Prior Publication Data
US 2020/0116331 A1  Apr. 16, 2020

(30) Foreign Application Priority Data
Mar. 15, 2017 (EP) .................................... 17161062

(51) Int. Cl.
*F21V 5/08* (2006.01)
*F21S 8/08* (2006.01)
(Continued)

(52) U.S. Cl.
CPC ................ *F21V 5/08* (2013.01); *F21S 8/086* (2013.01); *F21V 5/007* (2013.01); *G02B 3/0056* (2013.01);
(Continued)

(58) Field of Classification Search
CPC ... F21V 5/08; F21V 5/007; F21V 5/04; F21V 5/046; F21V 5/048; F21V 5/10;
(Continued)

(56) References Cited

U.S. PATENT DOCUMENTS 9,200,765 B1 * 12/2015 Broughton ................ F21V 5/04
9,611,986 B2 * 4/2017 Hyun ........................ G02B 3/02
(Continued)

FOREIGN PATENT DOCUMENTS

CN    101649990 A    2/2010
CN    202813212 U    3/2013
(Continued)

OTHER PUBLICATIONS

Lin, K. C. "Freeform Lens Design for Illumination with Different Luminance Intensities", Lin, J Comput Sci Syst Biol 2015, 8:2; pp. 99-103.

*Primary Examiner* — Joseph L Williams
*Assistant Examiner* — Jose M Diaz
(74) *Attorney, Agent, or Firm* — Dinsmore & Shohl LLP

(57) ABSTRACT

The present disclosure relates to an asymmetric illumination lens and an illumination system implementing at least one such lens, for example for illuminating a stadium play field.

20 Claims, 17 Drawing Sheets

(51) Int. Cl.
*F21V 5/00* (2018.01)
*G02B 3/00* (2006.01)
*G02B 19/00* (2006.01)
*F21Y 115/10* (2016.01)
*F21W 131/105* (2006.01)

(52) U.S. Cl.
CPC ..... *G02B 19/0009* (2013.01); *G02B 19/0066* (2013.01); *F21W 2131/105* (2013.01); *F21Y 2115/10* (2016.08)

(58) Field of Classification Search
CPC ... F21S 8/086; G02B 3/0056; G02B 19/0009; G02B 19/0066; G02B 19/0061; G02B 3/02; F21Y 2115/10; F21Y 2107/50; F21W 2131/105
See application file for complete search history.

(56) References Cited

U.S. PATENT DOCUMENTS

| | | | |
|---|---|---|---|
| 10,190,747 B1* | 1/2019 | Broughton | F21V 5/045 |
| 2008/0239722 A1* | 10/2008 | Wilcox | G02B 3/02 |
| | | | 362/268 |
| 2009/0290360 A1* | 11/2009 | Wilcox | F21S 8/02 |
| | | | 362/327 |
| 2010/0073937 A1* | 3/2010 | Ho | F21V 5/04 |
| | | | 362/335 |
| 2011/0235338 A1* | 9/2011 | Chen | G02B 19/0061 |
| | | | 362/311.02 |
| 2012/0039077 A1* | 2/2012 | Householder | F21V 5/08 |
| | | | 362/308 |
| 2012/0050889 A1* | 3/2012 | Lu | F21V 5/007 |
| | | | 359/718 |
| 2012/0051047 A1* | 3/2012 | Lu | G02B 3/0056 |
| | | | 362/235 |
| 2012/0306351 A1 | 12/2012 | Wilcox et al. | |
| 2012/0307503 A1* | 12/2012 | Wilcox | F21V 7/0091 |
| | | | 362/308 |
| 2013/0314927 A1* | 11/2013 | Chae | G02B 19/0014 |
| | | | 362/329 |
| 2014/0104853 A1* | 4/2014 | Lin | G02B 19/0061 |
| | | | 362/335 |
| 2015/0192256 A1* | 7/2015 | Hyun | G02B 19/0014 |
| | | | 362/335 |
| 2017/0175974 A1* | 6/2017 | Lee | F21V 5/04 |
| 2020/0049319 A1* | 2/2020 | Lanz | F21V 29/773 |
| 2020/0232617 A1* | 7/2020 | Kim | F21V 5/007 |

FOREIGN PATENT DOCUMENTS

| | | |
|---|---|---|
| EP | 2592334 A1 | 5/2013 |
| WO | 2008123960 A1 | 10/2008 |
| WO | 2012091433 A2 | 7/2012 |
| WO | 2013176832 A1 | 11/2013 |
| WO | 2014068497 A1 | 5/2014 |
| WO | 2015195167 A1 | 12/2015 |

* cited by examiner

ASYMMETRIC ILLUMINATION LENS

CROSS-REFERENCE TO RELATED APPLICATIONS

This application is the U.S. national stage of PCT/EP2018/056503 filed Mar. 15, 2018, which claims priority of European Patent Application 17161062.9 filed Mar. 15, 2017 of which are both hereby incorporated by reference in its entirety.

FIELD OF THE INVENTION

The present disclosure relates to an asymmetric illumination lens and an illumination system implementing at least one such lens, for example for illuminating a stadium play field.

BACKGROUND OF THE INVENTION

In the field of stadium illumination, asymmetric optics, such as reflectors, have been used for some years. The purpose of using asymmetric optics in stadiums is to minimize and control glare and light spillage while still maintaining a uniform light distribution all over the play field.

Asymmetric illumination lenses have also been known in the field of street light illumination for around 10 years. These asymmetric lenses are formed to uniformly distribute light intensity on a target area, such as on a road. Further, these asymmetric lenses are formed to distribute light along the road and to limit the light as much as possible across the road. As a consequence, the light is typically uniformly distributed in a pattern resembling a rectangle having a ratio of 4:1 with its longest side along the road.

The purpose of street lamps with asymmetric lenses is to illuminate a street as uniformly as possible and as much as possible along the street to limit the amount of light poles along the street. Further, the light should not be distributed to other areas, in particular to avoid light being distributed across the street to avoid illumination of for example houses on the other side of the street. An example of light distribution from street lamps employing asymmetric lenses is shown in FIG. 1.

Thus, asymmetric illumination lenses used in the field of street light illumination are not compatible with illumination lenses used in the field of stadium play field illumination where light is distributed across the play field.

However, to control the light distribution on a stadium play field, several solutions do exist that implement various types of lenses in all sorts of different shaped illumination systems.

Such solutions are nevertheless not effective. Some solutions may require several different optical components to be manufactured, several different systems to be assembled and finally to be set up in various different configurations along or above the stadium play field. Other solutions may produce a high amount of light pollution.

Accordingly, there is a need for improvement of illumination lenses and illumination systems to be used for illuminating stadium play fields.

SUMMARY OF THE INVENTION

It is a purpose of the present invention to provide an asymmetric illumination lens to be used for stadium illumination without the need of depending on various types of lenses, thereby providing a cost effective solution for stadium illumination.

Another purpose of the invention is to provide an asymmetric lens that produces low light pollution.

To overcome the above mentioned problems the present disclosure relates to an asymmetric illumination lens comprising: an inner surface and an outer surface, the outer surface for example defined by an X-axis, a Y-axis and a positive Z-axis according to a right-handed Cartesian coordinate system. The X-axis and the Y-axis may define varying outer closed curves in (X,Y)-planes along the positive Z-axis, wherein at least one of said closed curves is defined by: a critical point on the at least one closed curves having an X-value and a Y-value, defined as (Xc, Yc), a first point on the at least one closed curves having an X-value and a Y-value, defined as (X1, Y1), the first point having a first tangent parallel to the X-axis and/or a line intersecting the first point and being parallel to the first X-axis, Y1 having a lower value than Yc; a second point on the at least one closed curves having an X-value and a Y-value, defined as (X2, Y2), the second point having a second tangent parallel to the X-axis, Y2 having a higher value than Yc, and X2 having a value lower than Xc, such that a first line between the critical point and the second point has a negative slope; and a third point on the at least one closed curves having an X-value and a Y-value, defined as (X3, Y3), the third point having a third tangent parallel to the X-axis, Y3 having a higher value than Yc, and X3 having a value larger than Xc, such that a second line between the critical point and the third point has a positive slope, and wherein the first and second lines form an angle between said lines, the angle being less than 150 degrees, and/or wherein an intersection line being parallel to the X-axis and through the critical point, splits the total area of the closed outer curve into three sub-areas: a first sub-area below the intersection line, a second sub-area and a third sub-area above the intersection line, such that the second sub-area and the third sub-area together define more than 5 percent of the total area.

The (X,Y)-planes may be positioned parallel to a bottom plane or a base plane of the asymmetric lens. The (X,Y)-planes may also be parallel to a flange of the asymmetric lens. In most embodiments, the (X,Y)-planes may be parallel to a collar of the asymmetric lens.

In a first preferred embodiment of the asymmetric lens, the first and second lines form an angle between said lines, the angle being less than 150 degrees.

The technical effect of this embodiment is to distribute light towards a target plane defined by a (U,V)-plane, being parallel to the (X,Y)-plane, such that the light in the target plane is distributed asymmetrically along the V-axis and symmetrically along the U-axis. The light distribution has a peak-intensity (thus a non-uniform intensity distribution) and two intensity wings extending from the peak intensity and perpendicularly to each other. The lower the angle, the more the light is dispersed along the V-axis. An example of this illumination can be seen in top of FIG. 2. The inventors have found that when the lens and its (X,Y)-planes are angled with an angle of around 45 degrees relative to the target plane, for example a stadium play field, the target plane gets illuminated with light along the V-axis (a lateral axis) and along the U-axis (a longitudinal axis), such that all of the light is spread further along the lateral axis (the V-axis) than along the longitudinal axis (the U-axis), see bottom of FIG. 2. Here, it can also be seen that the peak intensity is spread out on the target plane and matches the intensity of the wings. Thus, the final light distribution ends up being close to uniformly spread on the target plane.

In another preferred embodiment of the asymmetric lens, an intersection line being parallel to the X-axis and going through the critical point, splits the total area of the closed outer curve into three sub-areas: a first sub-area below the intersection line, a second sub-area and a third sub-area above the intersection line, such that the second sub-area and the third sub-area together define more than 5 percent of the total area.

The technical effect of this embodiment is similar to the technical effect for the previous embodiment. Thus, both embodiments can contribute to the technical effect in combination with each other. Each embodiment can also contribute to the technical effect alone. The greater the percentage of the second and the third sub-area, the more the light is distributed along the V-axis in the target plane.

The two first preferred embodiments alone or in combination may provide that the outer surface is configured to transmit light along the Z-axis and towards a target plane, lying in a (U,V)-plane, wherein the (U,V)-plane is parallel to the (X,Y)-planes, such that the light in the target plane is distributed asymmetrically along the V-axis and symmetrically along the U-axis, the light distribution having a peak intensity and two wings extending from the peak intensity and perpendicularly to each other.

In some cases, the two first preferred embodiments may, although defined differently, cover the same embodiment. Thus, various definitions of the outer surface may provide the same technical effect of spreading light. Nevertheless, the inventors have found that a lens as disclosed herein provides the above described light distribution that is beneficial for illuminating a stadium play field, and at the same time also provides a low amount of light pollution.

In relation hereto, the present disclosure also relates to an illumination system for illuminating a stadium play field comprising a plurality of lenses, wherein each of the plurality of lenses is covering one light emitting diode or a plurality of light emitting diodes. In a preferred embodiment, at least a part of said plurality of lenses is a asymmetric illumination lens as described herein. Accordingly, a cost efficient illumination system is provided for stadium play field illumination. Further, the inventors have found that when using two of such illumination systems, set up on a stadium play field, one on each side of the play field, and their respective (X,Y)-planes are about perpendicular to each other, the final light distribution ends up being substantially uniformly spread on the target plane. An example of the light distribution formed by two such illumination systems is shown in FIG. 3. Thus, an illumination system incorporating the presently disclosed asymmetric illumination lens is very different from a street light, where substantial uniformity of the illuminated target is produced by a single lamp post, or by light posts placed side by side along one side of the road target area.

The presently disclosed asymmetric lens provides in comparison to a symmetric lens, lower light pollution, thus being the preferred choice over symmetric lenses. Accordingly, the presently disclosed illumination system provides in comparison to an illumination system with symmetric lenses also lower light pollution.

The present disclosure also relates to an illumination setup comprising at least two illumination systems, each illumination system comprising a plurality of asymmetric illumination lenses, e.g. the lenses disclosed herein, each illumination system configured for illuminating a stadium play field, such that the at least two illumination systems are placed with their respective (X,Y)-planes about perpendicular to each other on two sides of the stadium play field, and such that the light from the at least two illumination systems overlap and form a rectangular area on the stadium play field, wherein the rectangular area has its smallest dimensions along said two sides of the stadium play field.

As explained herein, an effect of the lenses and/or the illumination system, is that when two or more of said lenses and/or illumination systems are used in combination, however being separated by more than 50 meters, a rectangular illumination area is formed by each of said lenses or illumination systems, such that light intensity is substantially uniformly spread in the rectangular area.

The presently disclosed illumination setup may also comprise an array of LED light sources, and an array of asymmetric lenses, e.g. the lenses disclosed herein, wherein the lenses are symmetric in a first plane and asymmetric in a second plane, wherein the second plane is perpendicular to the first plane. The lenses may advantageously be the presently disclosed asymmetric illumination lens.

The present disclosure further relates the use of the presently disclosed asymmetric illumination lens for illuminating a stadium play field. The technical effect and advantages of the asymmetric illumination lenses are the same as described above.

DEFINITIONS

Figure 1:
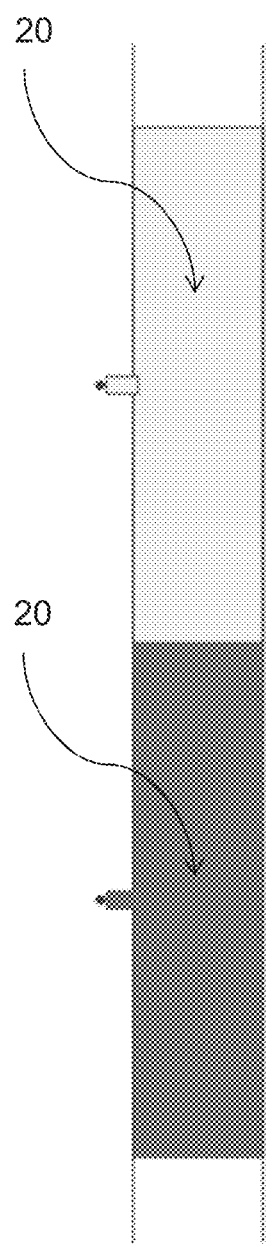
FIG. 1 shows illumination from typical street light lamps.

Critical Point:

In mathematics, a critical point is a point on a curve where its derivative may be zero, thus defining a stationary point, for example a turning point, where the derivative changes sign at the stationary point. A critical point may also be a point on a curve where its derivative is not defined. In such cases, the critical point may be a cusp.

Cusp:

In mathematics, a cusp is a point on a curve where a moving point on the curve must start to move backward. A cusp is a type of singular point of a curve. More specifically, if f is a function, defining a curve, then f has a vertical cusp at the point c if f is continuous (and finite) at c and $\lim_{x \to c_-} f'(x)$ and $\lim_{x \to c_+} f'(x)$ are infinities of opposite sign. In other words, f takes a sharp about-turn at the x-value of c.

DETAILED DESCRIPTION OF THE INVENTION

Asymmetric Illumination Lens

As already described for the presently disclosed asymmetric illumination lens, the lower the angle the more light is distributed further along the V-axis in the target plane. Hence, in one embodiment, the angle is less than 140 degrees, such as less than 130 degrees or such as less than 120 degrees.

Similarly, but for the second preferred embodiment of the asymmetric illumination lens, the greater the percentage of the second and the third sub-area the more the light is distributed further along the V-axis in the target plane. Hence, in another embodiment, the second sub-area and the third sub-area together define more than 10 percent of the total area or such as more than 15 percent of the total area.

In a most preferred embodiment, the at least one outer surface in the (X,Y)-planes is asymmetric along the Y-axis and symmetric along the X-axis. Such a surface provides for easy manufacture and design and integration in an illumination system and the setup thereof.

In some embodiments, the at least one outer closed curve is defined as a heart curve. A heart curve is generally speaking a curve that follows the shape of a heart. There are a number of mathematical curves that produce heart shapes. One curve may be produced by a so-called rotated cardioid (whose name means "heart shaped").

A cardioid is a plane curve traced by a point on the perimeter of a circle that is rolling around a fixed circle of the same radius. It can also be defined as an epicycloid having a single cusp. According to the invention, the heart shape or cardioid as here defined may differ slightly from the exact epicycloid, such that the cusp of these curves may instead be a critical point and have a derivative. Thus, the cardioid is in accordance with the curve of the outer surface as defined previously.

The cardioid may be defined in polar coordinates by the equation: $r(\theta)=1-\sin(\theta)$. This curve may easily be defined along the X-axis and the Y-axis in the right-handed Cartesian coordinate system of the present invention. However, a representation in the polar coordinate system may provide an easy understanding of the heart shape.

For example, using the polar representation, it can easily be verified, that the above polar equation has one cusp, in particular at $\theta=90$ degrees and three tangents in accordance with the present invention. The tangents are at $\theta_1=270$ degrees, $\theta_2=135$ degrees and $\theta_3=45$ degrees, where $\theta_1$ defines the first point, $\theta_2$ defines the second point and $\theta_3$ defines the third point. From this equation, it can further be verified that the angle between the second and the third point is 90 degrees, thus less than 150 degrees as defined by the first preferred embodiment.

As indicated, various mathematical representations of the cardioid or the heart shape exist. It may also be possible to rotate the curve, for example, the cardioid $r(\theta)=1-\sin(\theta)$ may be rotated by 90 degrees, thus represented by the equation $r(\theta)=1-\cos(\theta)$. However, a rotated heart curve given by the equation $r(\theta)=1-\cos(\theta)$, would not have third tangent parallel to the X-axis as defined by the present invention. One should therefore realize that a simple rotation by 90 degrees of the curve given by $r(\theta)=1-\cos(\theta)$ would fulfil the definition of the outer curve of the presently disclosed lens.

For the matter of completeness in relation to the Cartesian coordinate system, the equation $r(\theta)=1-\cos(\theta)$ is easily transformed to the Cartesian coordinate system and given by the equation: $(x^2+y^2-2ax)^2=4a^2(x^2+y^2)$, where a is an additional scale factor, set to $a=\frac{1}{2}$ to match the polar equation.

To define a heart curve directly in the right-handed Cartesian coordinate system, lines and arcs of curves, such as parabolas, circles, ellipses, or hyperbolas may be patched together. For example, a simple heart curve may be defined by affixing two half circles to adjacent sides of a square, choosing the radius of the circles equal to the side lengths of the square.

One should notice that using this definition of a heart curve, the first point (in this case the corner of the square) does not have a first tangent parallel to the X-axis. Thus in this case, the first point is a cusp, whereby a line is able to intersect the first point and being parallel to the first X-axis according to the invention. Alternatively, the corner of square may be replaced by a curved path to define a tangent parallel to the X-axis.

More complex definitions of the heart curve also exist. One example is to define a heart curve by patching two or more Bezier curves, in particular cubic Bezier curves. The heart shape may be defined by two patched cubic Bezier curves, where each cubic Bezier curve has a total of four points, a start point, two control points and end point. The start points for both curves may coincide and define the first point as herein defined. Similarly, the end points for both curves also coincide and define the critical point. The two control points are typically not on the curve but rather used for manipulating the curve on the way from the start point to the end point.

In one embodiment of the asymmetric illumination lens, the asymmetric lens has an outer top point defined as Xo, Yo and Zo, wherein a distance from the bottom of the asymmetric lens to the top point is more than 5 mm, or such as more than 10 mm, or such as more than 15 mm, such as around 16 mm, such as around 17 mm, such as around 18 mm, such as around 19 mm, such as around 20 mm.

In another embodiment of the asymmetric illumination lens, the a distance from (Xc, Yc) to (X1, X1) in the (X,Y)-plane is more than 15 mm, or such as more than 20 mm, such as around 21 mm, such as around 22 mm, such as around 23 mm, such as around 24 mm, or such as around 25 mm.

In yet another embodiment of the asymmetric illumination lens, a distance from (Xc, Yc) to (X2, Y2) and/or (X3, Y3) in the (X,Y)-plane is more than 5 mm, or such as more than 8 mm, such as around 9 mm, such as around 10 mm, such as around 11 mm, such as around 12 mm or such as around 13 mm.

A lens having one or more of the above dimensions is of relative large dimensions and therefore able to be manufactured using non-complex equipment, thus lowering the manufacturing cost.

A technical effect of a relative large lens is to be able to cover more than a single light emitting diode, such as an array of light emitting diodes (LEDs), whereby the lens in combination with an array of LEDs is able to provide a high light output.

In one embodiment of the asymmetric illumination lens, the inner surface defines varying inner closed curves in the (X,Y)-planes along the negative Z-axis, wherein at least one of said inner curves is defined as being symmetric along the X-axis and along the Y-axis. Having a symmetric inner closed curve enables a simple yet efficient illumination lens to be produced with low manufacturing cost.

In a second embodiment of the asymmetric illumination lens, the inner surface is concave as seen from a direction along the positive Z-axis. Such a shape is in particular simple and also enables a simple yet efficient illumination lens to be produced with low manufacturing cost.

In a preferred embodiment, the concave surface as just described comprises a base diameter of more than 2 cm, such as around 2.5 cm, such as around 2.6 cm, such as around 2.7 cm, such as around 2.8 cm, such as around 2.9 cm or such as around 3.0 cm. Having such a diameter enables to cover more than a single light emitting diode, such as an array of light emitting diodes (LEDs), whereby the lens in combination with an array of LEDs, in particular an array of LEDs having a cross section greater than 5 mm, such as between 5 and 10 mm, or greater than 10 mm, is able to provide a high light output. Further, not only is the inner diameter able to cover a large LED array, but also able to cover part of electronics wiring supplying power to an LED array. Thereby is provided a solution whereby the lens provides electronic wiring protection, such as shielding the electronic wiring for water and moist.

In most embodiments, the asymmetric lens has an outer top point defined as Xo, Yo and Zo, and wherein the inner surface comprises an inner top point defined by Xi, Yi and Zi, wherein Yi is different from Yo. This may contribute to a uniform light distribution in the (U,V)-plane.

In a most preferred embodiment, the illumination lens comprises a flange adapted to be attached with an O-ring, the flange having an inner diameter being more than 2 cm, such as around 2.5 cm, such as around 2.6 cm, such as around 2.7 cm, such as around 2.8 cm, such as around 2.9 cm or such as around 3.0 cm.

The flange with such a diameter enables to cover both a single LED (or a large array of LEDs) and part of electronics wiring supplying power to such an LED or array thereof. Thereby is provided a solution whereby the lens in combination with the flange and the O-ring provides improved electronic wiring protection, such as shielding the electronic wiring for water and moist. The inventors have observed that their asymmetric lenses having the here described flange and O-ring does protect the electronic wiring from moist and water damages, such that light sources are not short circuited. In particular, the inventors have found that by making the flange and the O-ring larger than the holder that typically secures the LED to the heat sink, the O-ring may form an effective seal between the lens and the insulating material that typically surrounds the electronic wiring. Thereby, moist is prohibited from entering cracks or gaps that usually arise between the holder and the insulating material. Thus, by this embodiment the life span of light sources and material below the lenses is extended beyond what is possible with lenses having an O-ring with a smaller diameter.

In most embodiments, the inner surface is configured to receive light from a light source transmitting light along the positive Z-axis, and wherein the outer surface is configured to transmit light having propagated from the light source to the inner surface and further to the outer surface. In other words, in most embodiments, the asymmetric lens according to the present invention is a light transmitting element.

Illumination System for Illuminating a Stadium Play Field

In relation to the presently disclosed illumination system for illuminating a stadium play field, the plurality of lenses may be an array of more than 5×5 lenses, such as more than 10×10 lenses, such as more than 14×14 lenses, such as more than 14×20 lenses, such as 14×25 lenses. Such an array provides a single illuminating system that provides a high light output, in particular to cover and illuminate more than 1/10 of a European soccer field, such as more than 1/8 of a European soccer field, such as around 1/6 of a European soccer field. The inventors have found that the array of 14×25 lenses is able to illuminate 1/6 of a European soccer field, meaning that only 6 of such illumination systems may be required to illuminate a full European soccer field. In the specific embodiment, the inventors found that all of the 6 illumination systems could be identical to meet the requirements of illuminating the soccer field. Accordingly, the present disclosure provides a low cost illumination setup with only 6 identical illumination systems according to the present invention, three on each side of the soccer field. In the just described embodiment, each of the six illumination systems is a 4500 W system, thus enabling the six illumination system to produce an average illumination of 250 Lux on a typical soccer field.

Each of said lenses may advantageously be the presently disclosed asymmetric illumination lens. Having an illumination system with identical lenses provides a simple and low cost solution for an illumination system.

The plurality of light emitting diodes covered by each of the lenses may be in the form of a single chip-on-board (COB) device also referred to as a High-Density (HD) LED array. In other words, a chip on board device is an array of LEDs, for example a 2D array of individual LEDs, or a 2D array of individual 2D arrays. Such a chip is able to provide a high light output, thus providing a light efficient illumination system.

In most embodiments, said light emitting diode(s) covered by each of the lenses is/are connected to electronic wiring embedded in an electronically insulating layer, such as silicone.

In a preferred embodiment, said light emitting diode(s) covered by each of the lenses is attached to the heat sink via a holder.

In a most preferred embodiment, each of said lenses is mounted on top of the electronic-insulating layer with an O-ring between each of said lenses and the insulating layer, the O-ring having an inner diameter being greater than an outer dimension of the holder.

As described previously, the inventors have observed that the O-ring does protect the electronic wiring from moist and water damages, such that light sources are not short circuited, and/or material around the electron wiring does not crack. When the O-ring is dimensioned as here defined, moist is prevented from entering the array of LEDs via gaps occurring between the holder and the insulating layer, thus providing better water and moist sealing.

Thus, by this embodiment the life span of light sources and material below the lenses is extended beyond what is possible with lenses having an O-ring with an inner diameter that matches or is smaller than the outer diameter of the holder.

In one embodiment, the holder is black for reducing light pollution. This solution may reduce the light output a bit in comparison to a white holder, but reduction of light pollution is an important aspect of this invention.

In most embodiments, the illumination system is mounted to a pole, the pole being more than 10 meters, such as more than 15 meters, such as 16 meters, such as 17 meters, such as 18 meters, such as 19 meters or such as 20 meters. This provides for an efficient light distribution to the stadium play field.

In some embodiments, there may be two or more illumination systems mounted to a pole, for example to produce a high illumination of 500 Lux.

In a preferred embodiment, the illumination system is mounted to a pole such that all of the lenses and their respective (X,Y)-planes are angled with an angle of around 45 degrees relative to the plane of the stadium play field, whereby the stadium play field defines a lateral axis and a longitudinal axis, such that the stadium play field is illuminated with light along the lateral axis and along the longitudinal axis, the lateral axis being a linear projection of the Y-axis of the lens, and the longitudinal axis being a linear projection of the X-axis of the lens such that all of the light is dispersed further along the lateral axis than along the longitudinal axis. Thus, the presently illumination system can provide that light illumination on a stadium play field may be both close to uniformly spread and further along the lateral axis than along the longitudinal axis.

LIST OF REFERENCE NUMBERS

1—asymmetric illumination lens
2—outer surface
3—inner surface
4—outer closed curve
5—bottom of outer surface
6—critical point
7—first point
8—first tangent
9—second point
10—second tangent
11—first line
12—third point
13—third tangent
14—second line
15—angle
16—intersection line
17—total area
18—first sub-area
19—second sub-area
20—target plane
21—peak intensity
22—two wings
23—outer top point
24—inner closed curve
25—base diameter
26—inner top point
27—flange
28—O-ring
29—illumination system
30—light emitting diode(s)
31—insulating layer
32—holder
33—collar Example 1—an Example of Light Distribution from Street Lamps Employing Asymmetric Lenses FIG. 1 shows light distribution from street lamps according to prior art, and demonstrates that light from a street lamp is spread along the road in a rectangular area, typically in an aspect ratio of the rectangle being 1:4, where the longest side is along the road. Typically, the distance between lamp posts is around 30 meters.

Figure 2:
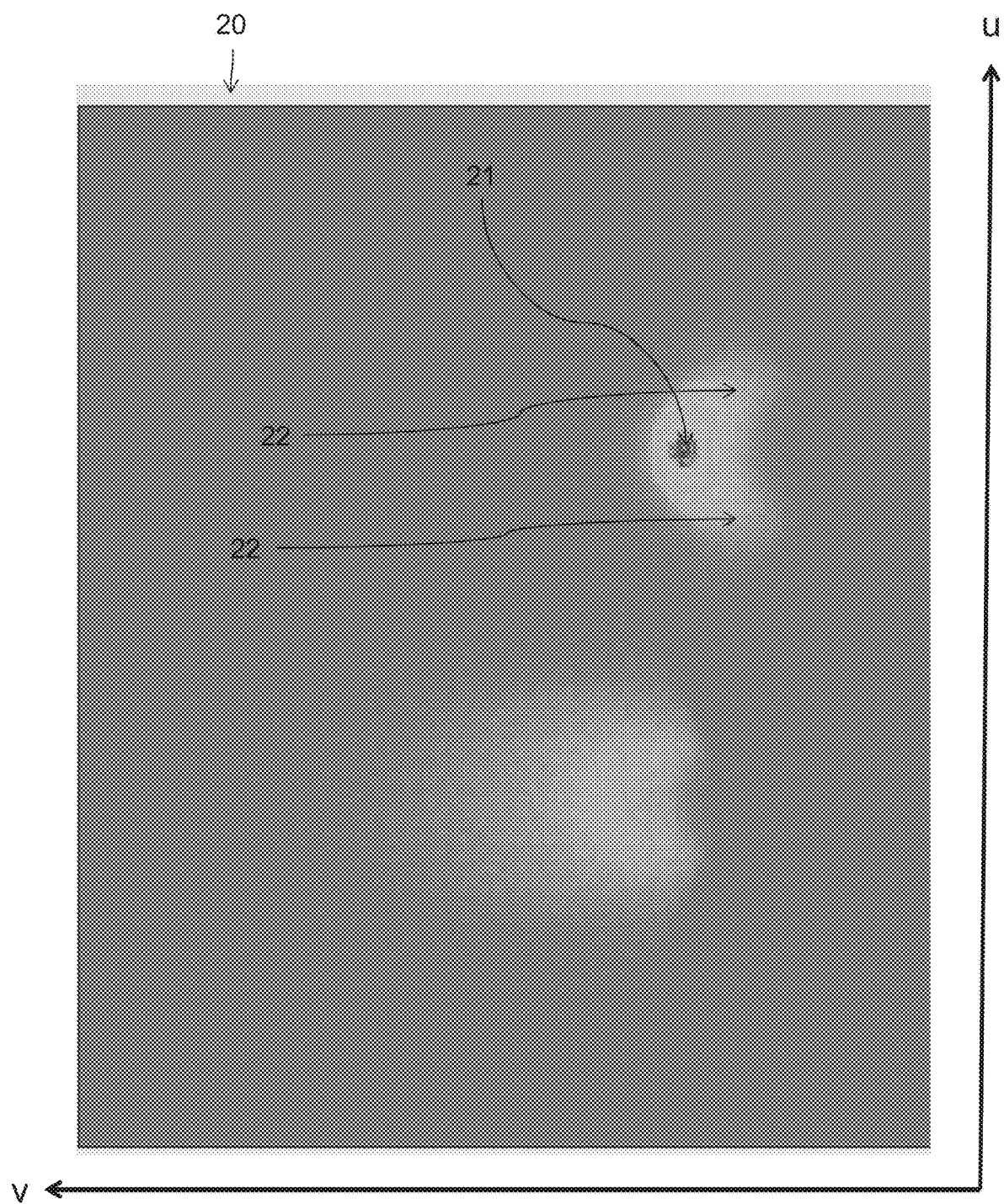
FIG. 2 shows one embodiment of the light distribution from one or more illumination lenses according to the present invention when the (X,Y)-plane of the lenses are a) parallel to the stadium play field (top) and b) angled at 45 degrees with respect to the stadium play field (bottom).

Example 2—an Example of Light Distribution from One or More Asymmetric Lenses According the Present Invention FIG. 2 shows an example of illumination from the asymmetric lens(es) of the present invention. In the top of FIG. 2, light is transmitted towards a target plane 20 defined by a (U,V)-plane, in this case being parallel to the (X,Y)-plane, such that the light in the target plane 20 is distributed asymmetrically along the V-axis and symmetrically along the U-axis. In the bottom of FIG. 2, light is transmitted towards a target plane 20 defined by a (U,V)-plane, in this case being angled around 45 degrees (here, specifically 43 degrees) to the (X,Y)-plane, such that the light in the target plane 20 is distributed asymmetrically along the V-axis and symmetrically along the U-axis. In the first case, top of FIG. 2, the light distribution has a peak-intensity 21 (thus a non-uniform intensity distribution) and two intensity wings 22 extending from the peak intensity 21 and perpendicularly to one another. The peak-intensity is shown in red and the two wings stretching out from the peak-intensity is fading out to a lower intensity as shown as blue. In the second case, bottom of FIG. 2, the target plane gets illuminated with light along the V-axis (a lateral axis) and along the U-axis (a longitudinal axis), such that all of the light is spread further along the lateral axis (the V-axis) than along the longitudinal axis (the U-axis). By comparing the two illumination cases, it can be seen that the peak-intensity 21 is spread out on the target plane when the (X,Y)-plane is angled around 45 degrees to the (U,V)-plane whereby the intensity of the two wings 22 matches the peak-intensity 21 of the first illumination case. The intensity is shown in blue all over. Thus, the light distribution ends up being close to uniformly spread on the target plane as the (X,Y)-plane is angled towards 45 degrees from the (U,V)-plane.

Figure 3:
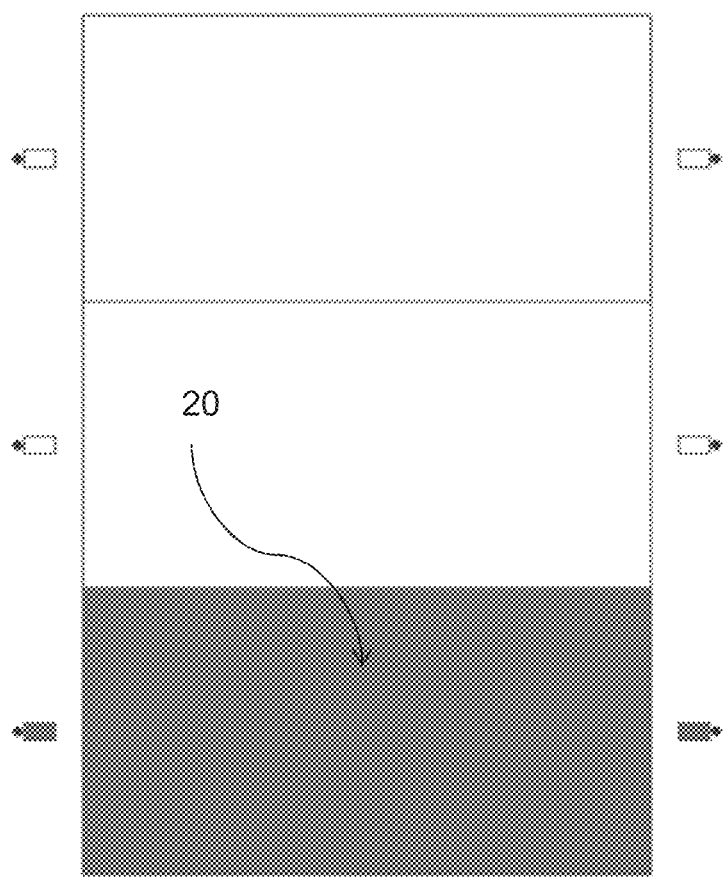
FIG. 3 shows illumination from two illumination systems according to the present invention.

Example 3—an Example of Light Distribution Formed by Two Illumination Systems According to the Present Invention FIG. 3 shows two illumination systems according to the present invention, set up on a stadium play field, one on each side of the play field, and their respective (X,Y)-planes are about perpendicular to each other, meaning they their respective (X,Y)-planes each are angled about 45 degrees relative to the (U,V)-plane. As a result, the final light distribution ends up being substantially uniformly spread on the (U,V)-plane.

Figure 4:
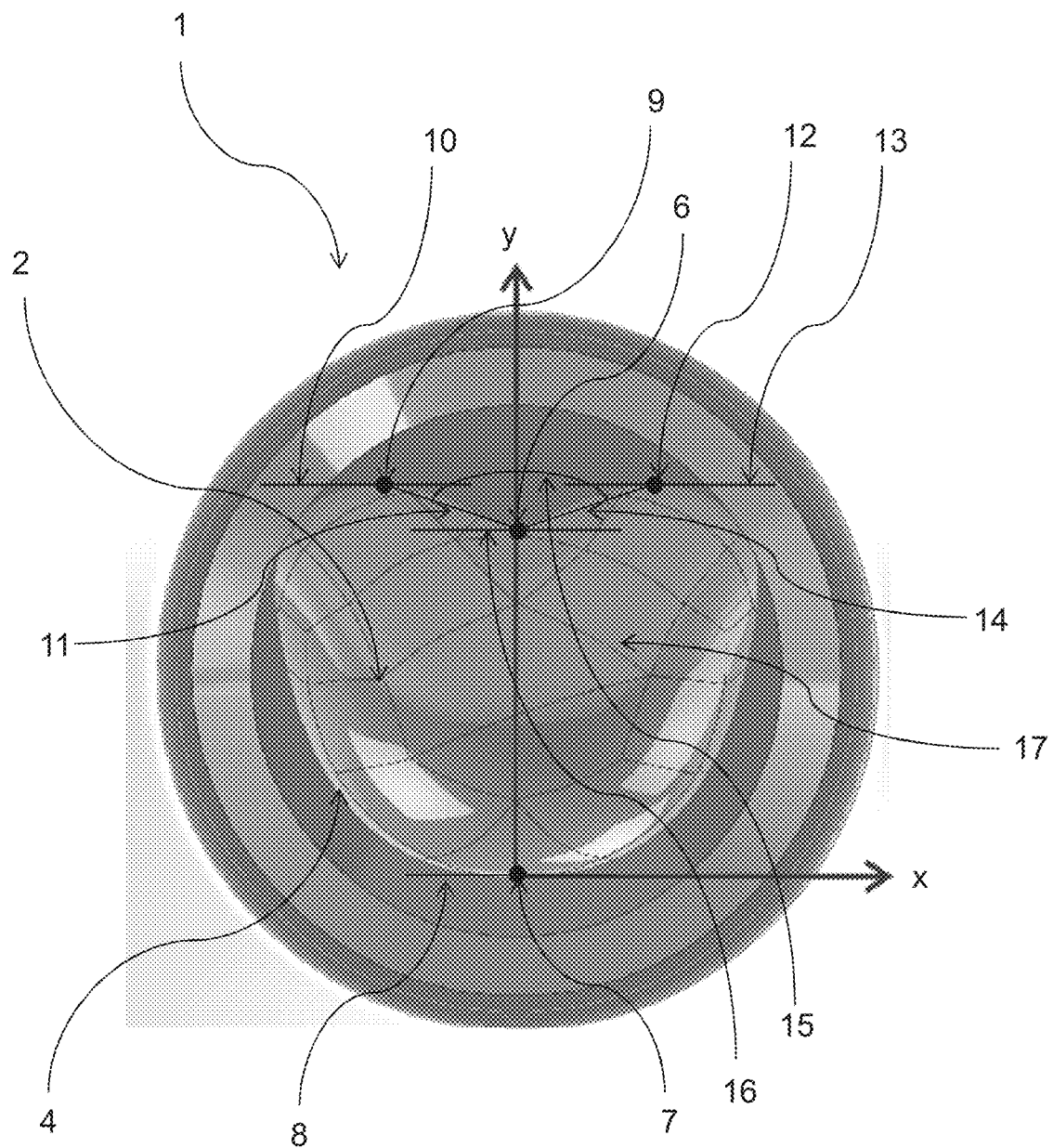
FIG. 4 shows a first preferred embodiment of the illumination lens according to the present invention from a top view, showing the angle defined by the first and second line.

Example 4—One Embodiment of the Illumination Lens According to the Present Invention Shown from a Top View FIG. 4 shows one embodiment of the illumination lens according to the present invention from a top view. The illumination lens 1 as shown in FIG. 4 has an outer surface 2 from which the outer closed curve 4 can be seen. The curve is defined by the four points: the critical point 6, the first point 7, the second point 9, and the third point 12. Further, FIG. 4 shows the first tangent 8, the second tangent 10, the third tangent 13, and the intersection line 16. The first line 11 and the second line 14 define the angle 15. In this example, the angle 15 is 144 degrees, i.e. less than 150 degrees. FIG. 4 shows the total area 17 of a closed outer curve.

Figure 5:
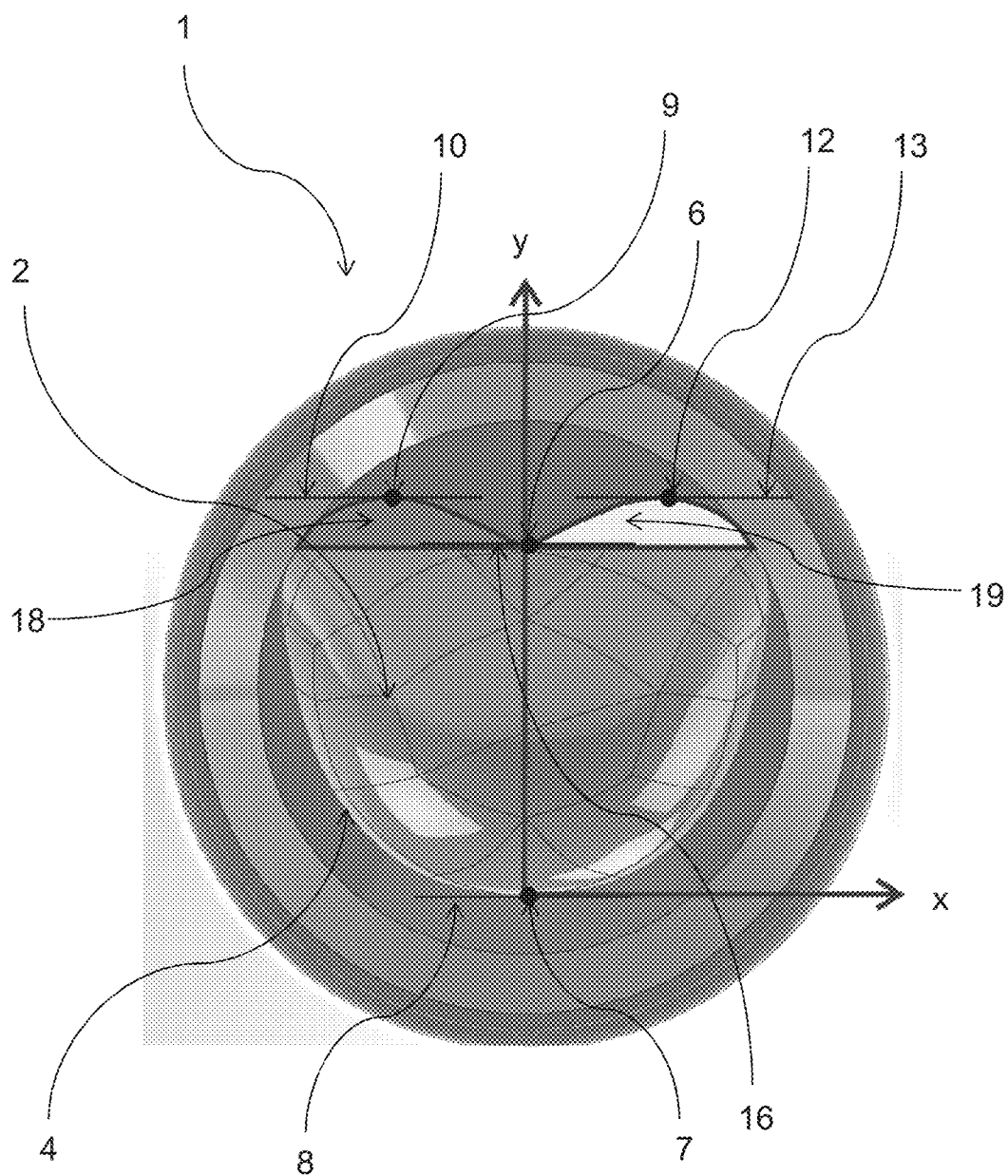
FIG. 5 shows a second preferred embodiment of the illumination lens according to the present invention from a top view, showing the areas defined by the intersection line.

Example 5—One Embodiment of the Illumination Lens According to the Present Invention Shown from a Top View FIG. 5 shows one embodiment of the illumination lens according to the present invention from a top view. The illumination lens 1 as shown in FIG. 5 has an outer surface 2 from which the outer closed curve 4 can be seen. The curve is defined by the four points: the critical point 6, the first point 7, the second point 9, and the third point 12. Further, FIG. 5 shows the first tangent 8, the second tangent 10, the third tangent 13, and the intersection line 16. The intersection line defines the first sub-area 18 and the second sub-area 19 as part of the total area 17 (to be seen in FIG. 4).

Figure 6:
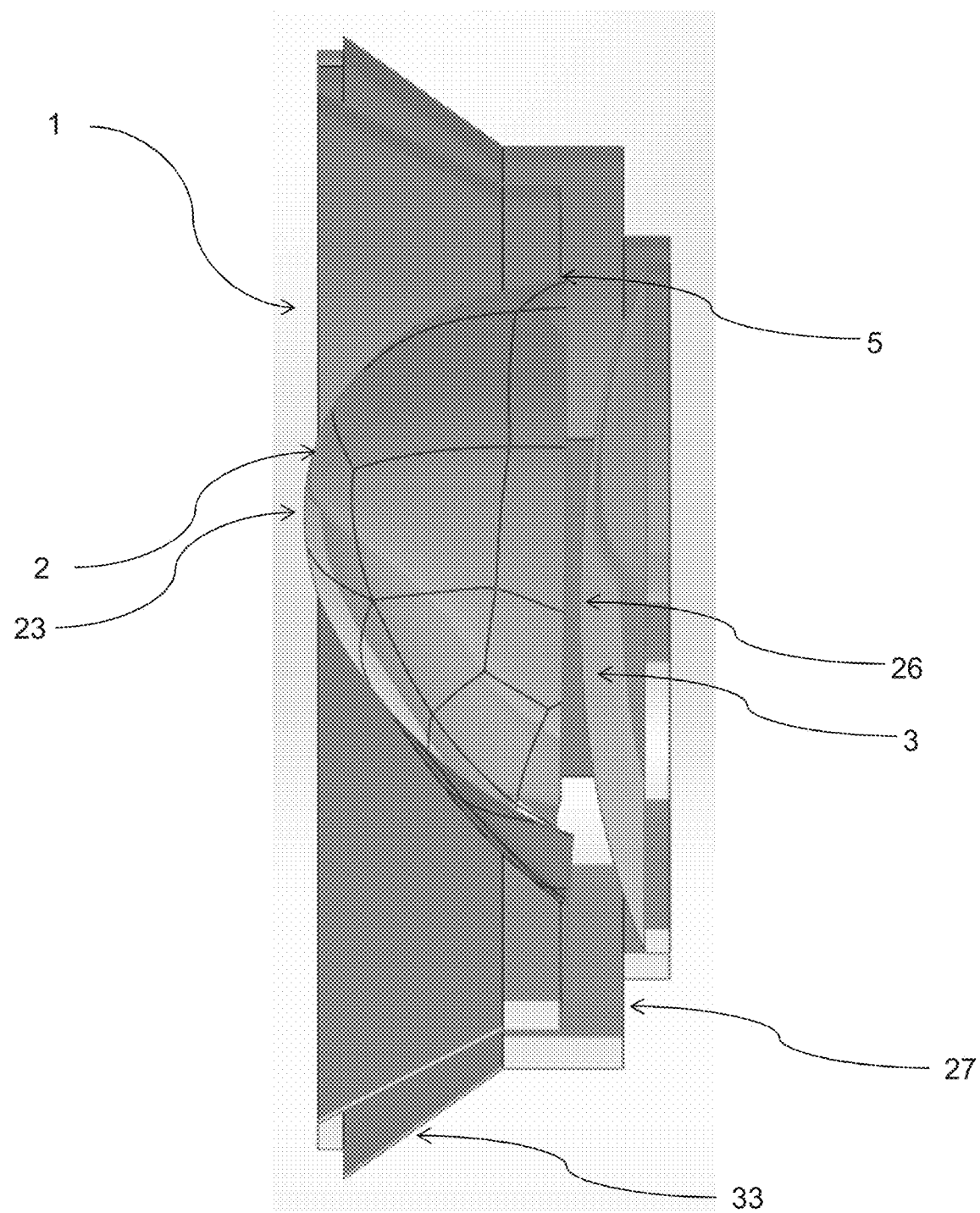
FIG. 6 shows one embodiment of the illumination lens according to the present invention from a side view.

Example 6—One Embodiment of the Illumination Lens According to the Present Invention Shown from a Side View FIG. 6 shows an example of a cross section of an asymmetric lens 1, in which the cross section is taken along the symmetrical axis, resulting in a cross sectional view of the asymmetrical lens profile. The figure shows the inner surface 3, the outer surface 2, and a flange 27. A collar 33 surrounding the outer surface is also shown. The collar fits into a bracket (not shown) that secures the lens over one or more LED(s) 30 (not shown). FIG. 6 shows a bottom 5 of the outer surface 2. Further, FIG. 6 shows an outer top point 23 and an inner top point 26.

Figure 7:
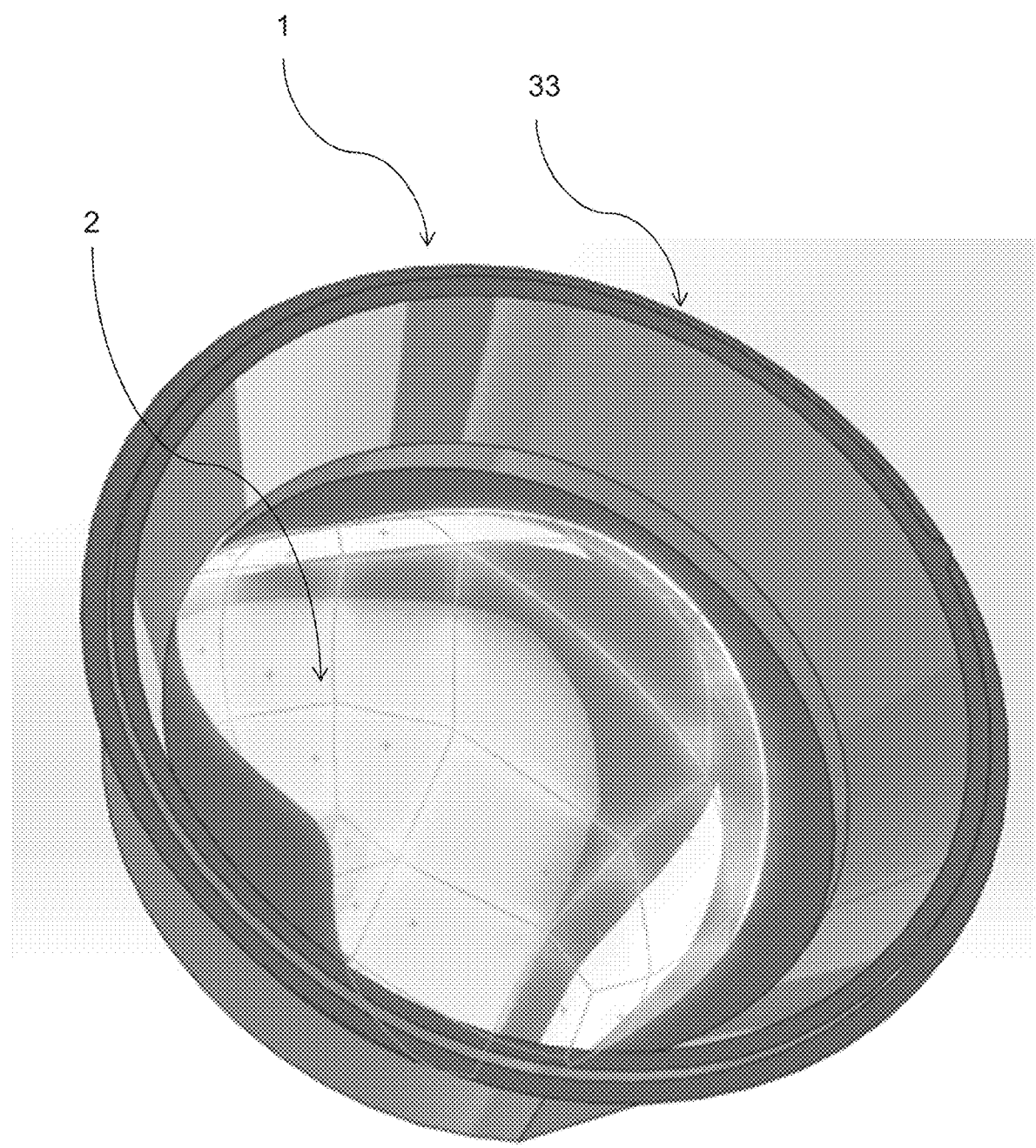
FIG. 7 shows one embodiment of the illumination lens according to the present invention from a first perspective view.

Example 7—One Embodiment of the Illumination Lens According to the Present Invention from a First Perspective View FIG. 7 shows one example of an asymmetric lens 1 in a perspective view. The figure shows the outer surface 2 (blue colour) and a collar 33.

Figure 8:
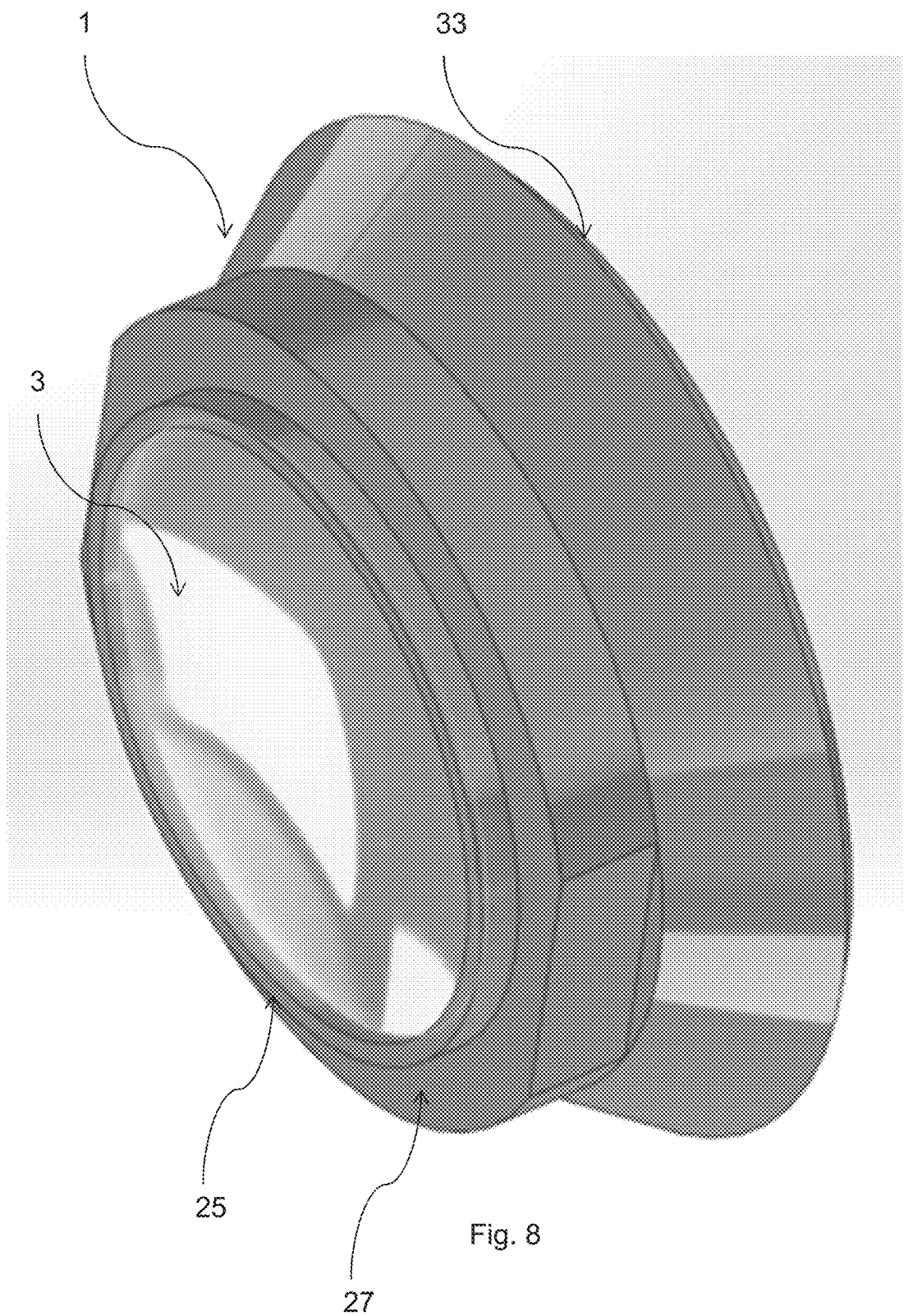
FIG. 8 shows one embodiment of the illumination lens according to the present invention from a second perspective view.

Example 8—One Embodiment of the Illumination Lens According to the Present Invention from a Second Perspective View FIG. 8 shows one example of an asymmetric lens 1 in a perspective view. The figure shows the inner surface 3 (blue colour), a flange 27 and a collar 33. The inner lens is concave and has a base diameter 25 at the rim of the inner surface 3.

Figure 9:
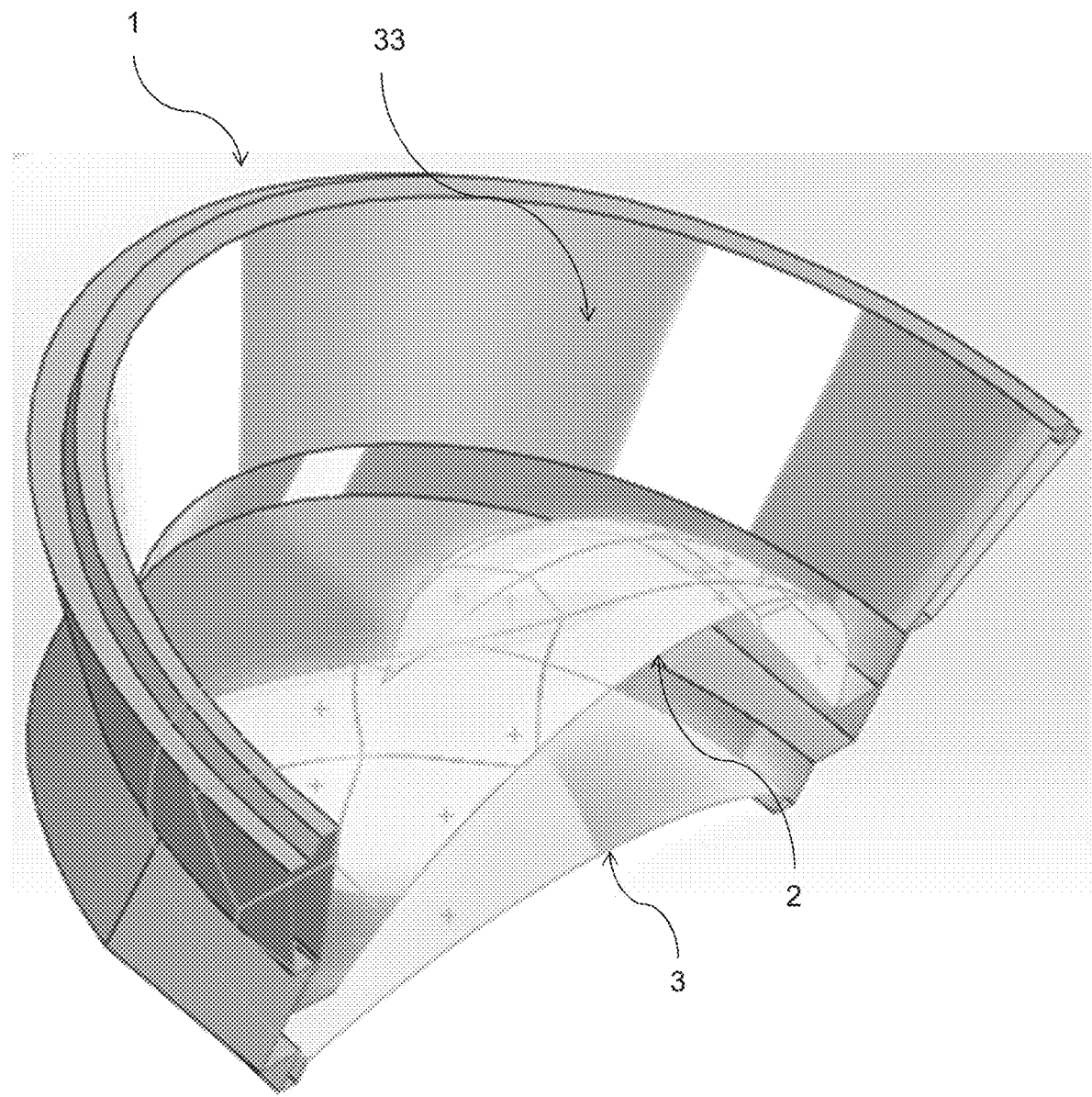
FIG. 9 shows one embodiment of the illumination lens according to the present invention from a third perspective view and as cut through the lens.

Example 9—One Embodiment of the Illumination Lens According to the Present Invention from a Third Perspective View and as Cut Through the Lens FIG. 9 shows one example of an asymmetric lens 1 in a perspective, cross sectional view. The figure shows the outer 2 and inner surfaces 3 (blue colour) and a collar 33.

Figure 10:
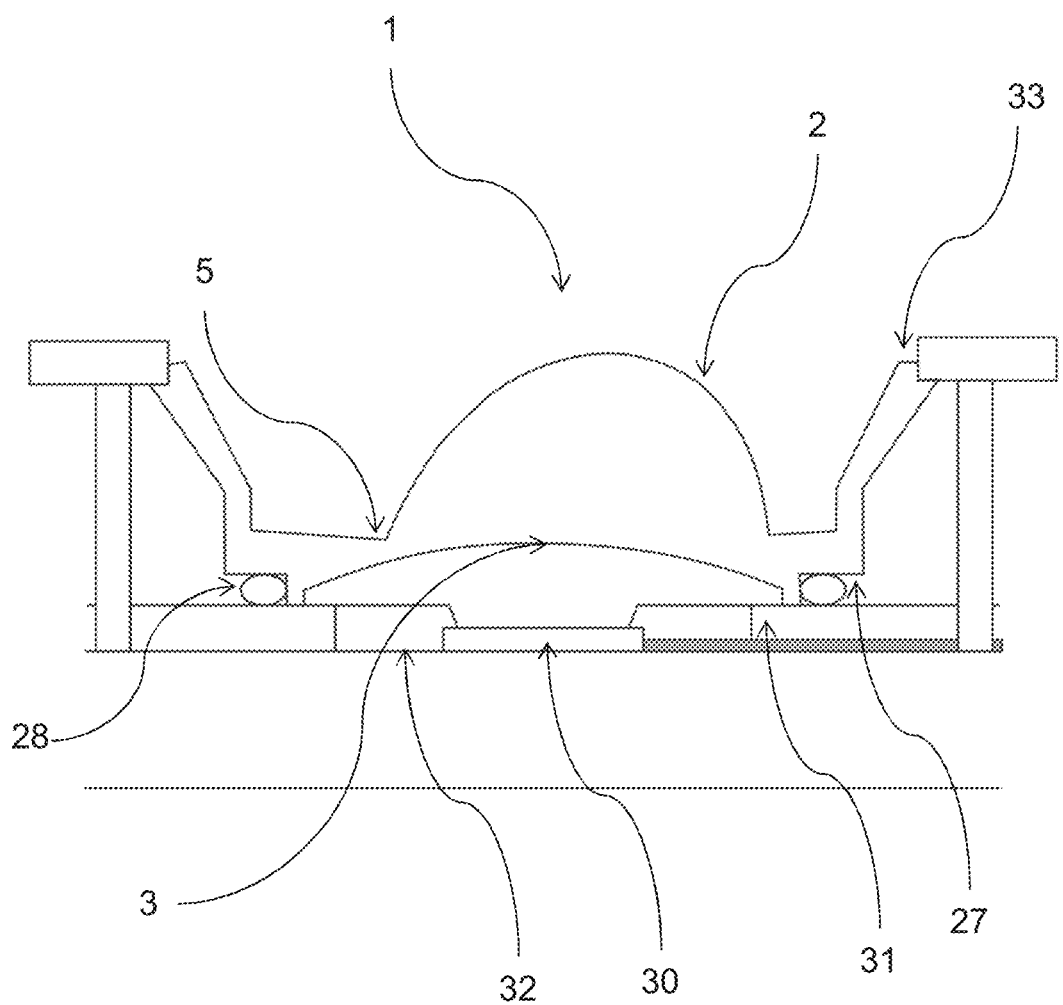
FIG. 10 shows an embodiment of the illumination lens according to the present invention in a first cross sectional view.

Example 10—an Embodiment of the Illumination Lens According to the Present Invention in a First Cross Sectional View FIG. 10 shows an example of a cross section of an asymmetric lens 1, in which the cross section is taken along the symmetrical axis of the lens 1, resulting in a cross sectional view of the asymmetrical lens profile. The figure shows the inner surface 3 of the lens 1, the outer surface 2 of the lens, a flange 27 and a collar 33 of the lens. Moreover, the figure shows an LED 30 that is secured to a heat sink by a holder 32. It also shows the electric wiring supplying current to the LED 30. The electric wiring is embedded in an electrically insulating material 31. There is also shown an O-ring 28 that forms a seal between the lens and the insulating material. The O-ring 28 protects the electric wiring and the LED 30 from moist entering from the outside. The lens 1 is tightly fixed to the LED via a bracket and screws that are screwed into the heat sink.

Figure 11:
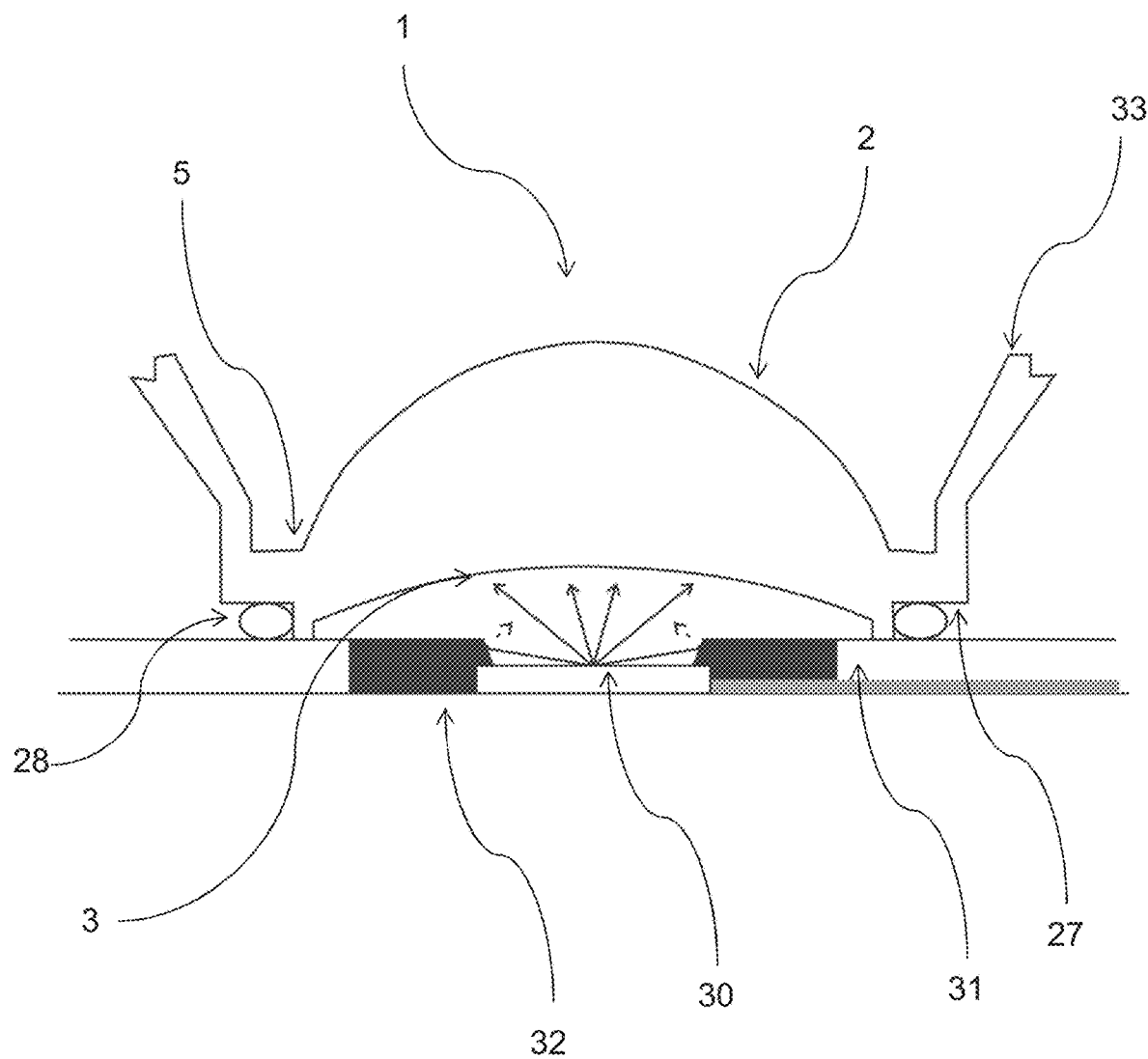
FIG. 11 shows an embodiment of the illumination lens according to the present invention as a structure from a second side view.

Example 11—an Embodiment of the Illumination Lens According to the Present Invention as a Structure from a Second Cross Sectional View FIG. 11 shows one lens in an illumination system 29, as described in FIG. 10, in which the holder 32 is made in a black material, such as black polycarbonate. The black holder reduces the amount of scattered light and thereby the amount of light pollution.

Figure 12:
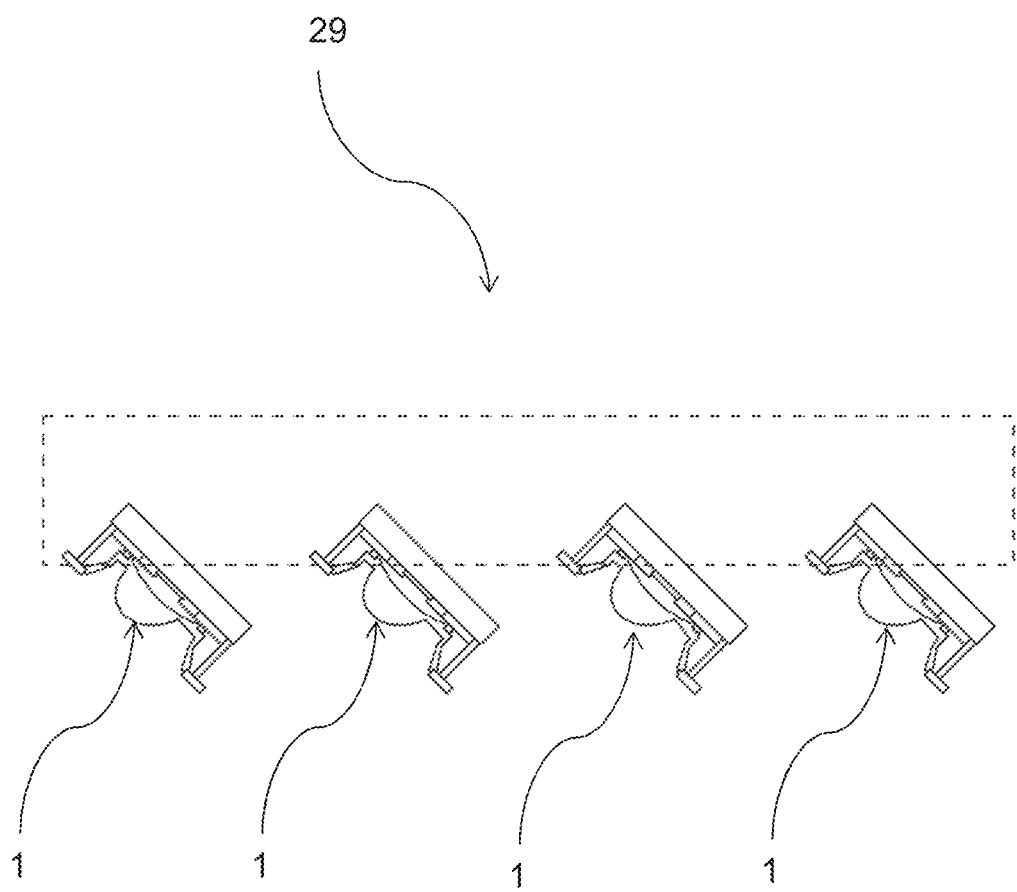
FIG. 12 shows one embodiment of the illumination system according to the present invention.

Example 12—One Embodiment of the Illumination System According to the Present Invention FIG. 12 shows an illumination system 29 comprising four one-dimensional arrays of lenses 1, in which each of the arrays are tilted 43 degrees with respect to the illumination system and/or a target plane 20. In this manner, the body of the illumination system 29 is mounted in a horizontal position, with the advantage that wind resistance is reduced.

Figure 13:
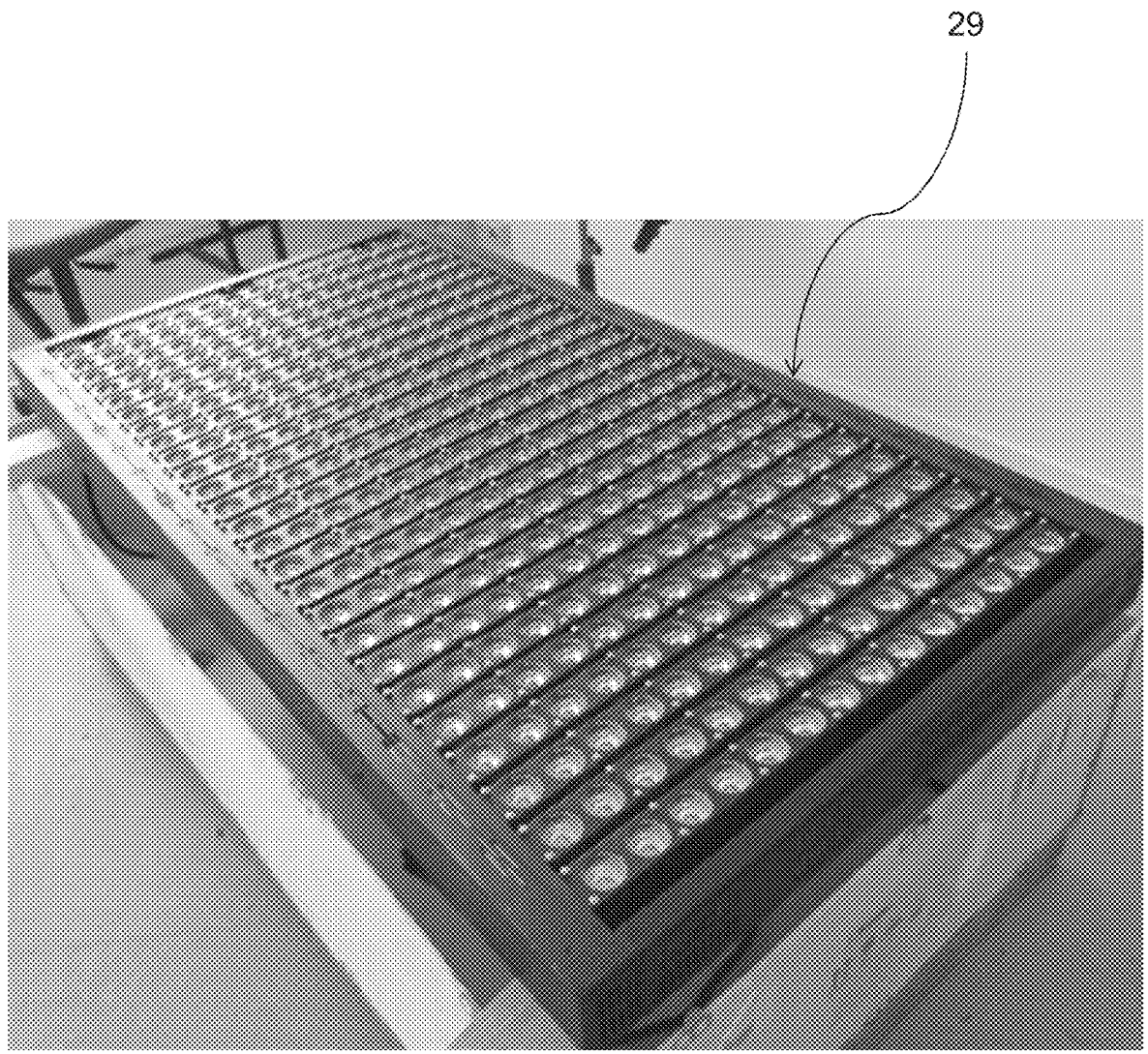
FIG. 13 shows a photo, demonstrating an example of the illumination system according to the present invention.

Example 13—a Photo of the Illumination System According to the Present Invention FIG. 13 shows a photograph of an illumination system 29 comprising 350 LEDs and 350 lenses.

Figure 14:
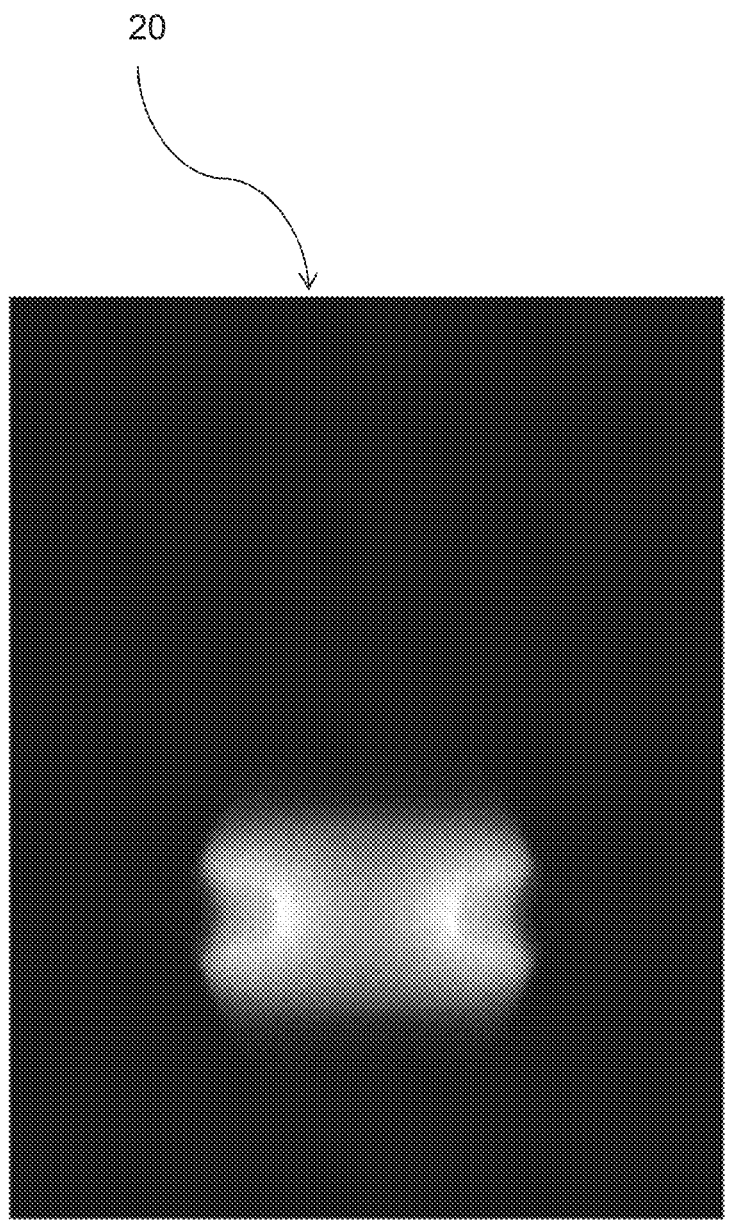
FIG. 14 shows one embodiment of the light distribution from two illumination systems according to the present invention when the (X,Y)-planes of the lenses are angled at about 45 degrees with respect to the stadium play field.

Example 14—One Embodiment of the Light Distribution from Two Illumination Systems FIG. 14 shows a light distribution from two illumination systems 29 (not shown) positioned opposite to one another along two sides of a play field. The light distribution is shown in the target plane 20.

Figure 15:
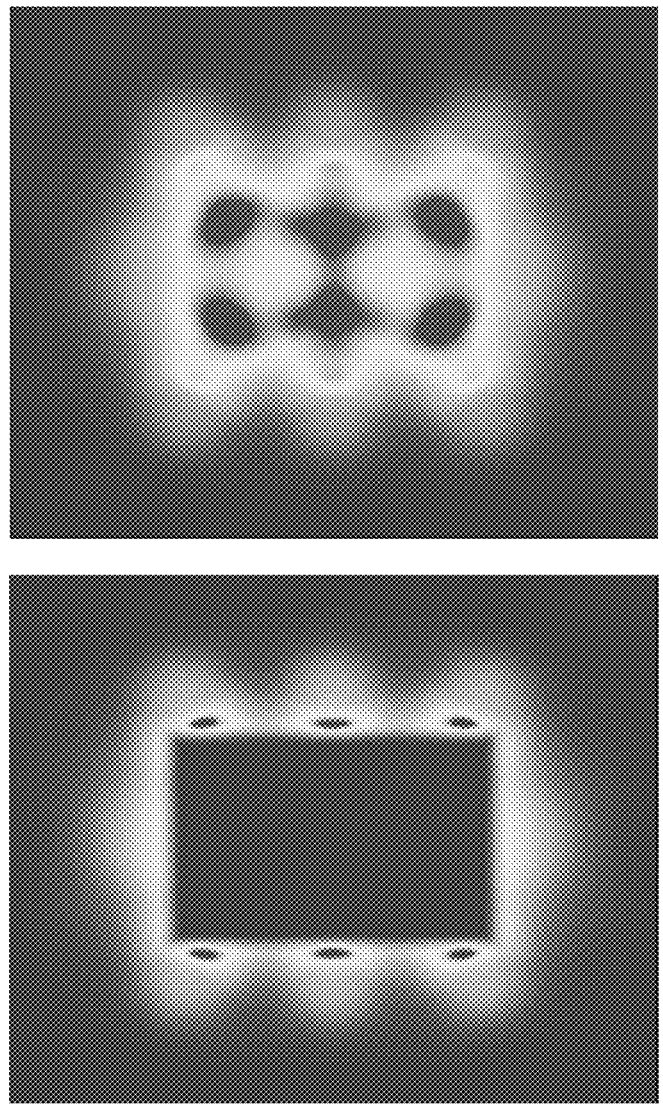
FIG. 15 shows a traditional light distribution on a soccer pitch in which 18 metal halide lamps distributed on six light poles are employed.

Example 15—Traditional Light Distribution on a Soccer Pitch in which 18 Metal Halide Lamps Distributed on Six Light Poles are Employed FIG. 15 (upper figure) shows a traditional light distribution on a soccer pitch in which 18 metal halide lamps distributed on six light poles are employed. FIG. 15 (lower figure) shows a traditional light distribution on a soccer pitch in which 18 metal halide lamps distributed on six light poles are employed, and in which the pitch itself is marked by the blue rectangle in the centre. Hence, the remaining coloured light distribution represents the spill light. This example is for comparisons with the present invention.

Figure 16:
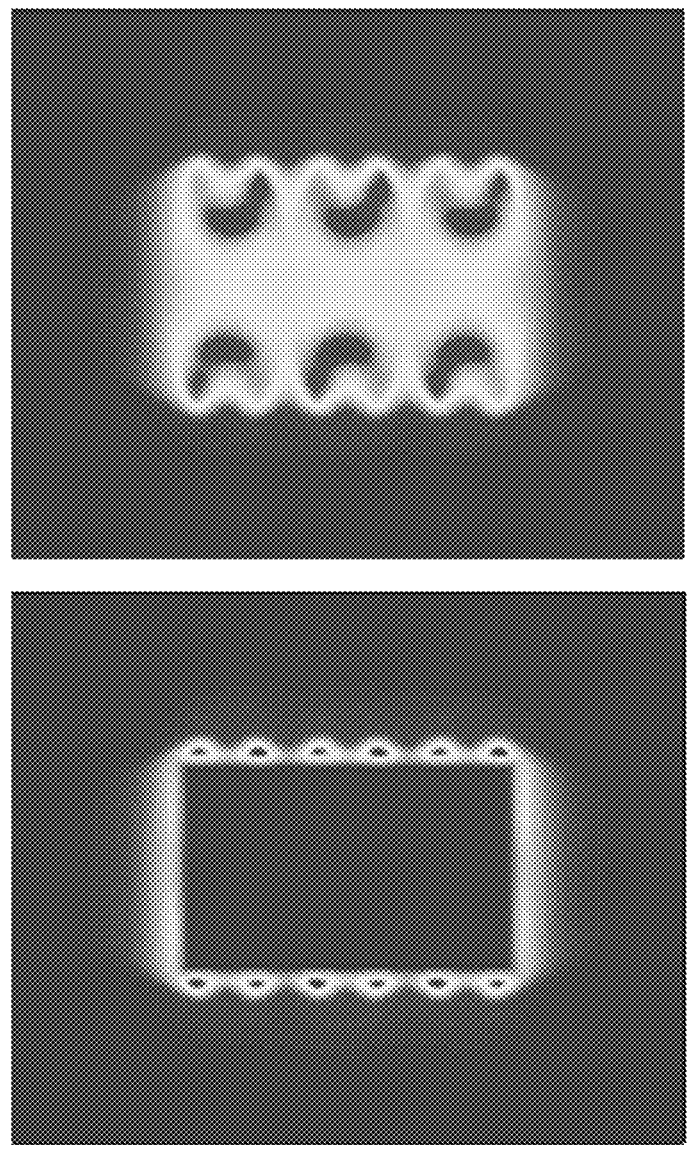
FIG. 16 shows a light distribution on a soccer pitch in which six illuminations systems according to the present invention are distributed on six poles.

Example 16—Light Distribution on a Soccer Pitch in which Six Illumination Systems According to the Present Invention are Distributed on Six Poles FIG. 16 (upper figure) shows a light distribution on a soccer pitch in which six illuminations systems 29 according to the present invention are distributed on six light poles, i.e. there is illumination system mounted to each pole. FIG. 16 (lower figure) shows a light distribution on a soccer pitch in which six illumination systems 29 according to the present invention are distributed on six light poles, i.e. one illumination system 29 mounted to each pole. The pitch is marked by the blue rectangle in the centre. The remaining coloured light distribution represents the spill light. It can be seen by comparison with FIG. 15 (lower figure) that the amount of spill light is reduced by employing the present invention.

Figure 17:
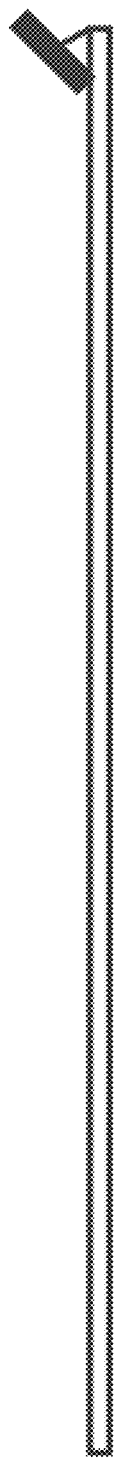
FIG. 17 shows a light pole with a light illumination system mounted thereto.

FIG. 17—a light pole with a light illumination system mounted thereto

FIG. 17 shows an illumination system mounted to a pole using two attachment points on the pole, thereby providing a stable attachment. The angle of the (X,Y)-planes of the illumination lenses is mounted such that the angle to the target plane is about 45 degrees.

Further examples of the invention are provided by the following items.

Items

1. An asymmetric illumination lens, comprising:
an inner surface and an outer surface, wherein the outer surface is defined by an X-axis, a Y-axis and a positive Z-axis according to a right-handed Cartesian coordinate system, wherein the X-axis and the Y-axis defines varying outer closed curves in (X,Y)-planes along the positive Z-axis, wherein at least one of said closed curves is defined by:
a critical point having an X-value and a Y-value, defined as (Xc, Yc),
a first point having an X-value and a Y-value, defined as (X1, Y1), the first point having a first tangent parallel to the X-axis and/or a line intersecting the first point and being parallel to the first X-axis, Y1 having a lower value than Yc;
a second point having an X-value and a Y-value, defined as (X2, Y2), the second point having a second tangent parallel to the X-axis,
Y2 having a higher value than Yc, and X2 having a value lower than Xc, such that a first line between the critical point and the second point has a negative slope; and
a third point having an X-value and a Y-value, defined as (X3, Y3), the third point having a third tangent parallel to the X-axis, Y3 having a higher value than Yc, and X3 having a value larger than Xc, such that a second line between the critical point and the third point has a positive slope, and wherein the first and second lines form an angle between said lines, the angle being less than 150 degrees, and/or wherein an intersection line being parallel to the X-axis and through the critical point, splits the total area of the closed outer curve into three sub-areas: a first sub-area below the intersection line, a second sub-area and a third sub-area above the intersection line, such that the second sub-area and the third sub-area together define more than 5 percent of the total area.

2. The asymmetric illumination lens according to item 1, wherein the angle is less than 140 degrees, such as less than 130 degrees or such as less than 120 degrees.

2. The asymmetric illumination lens according to item 1, wherein the second sub-area and the third sub-area together define more than 10 percent of the total area or such as more than 15 percent of the total area.

3. The asymmetric illumination lens according to item 1, wherein the outer surface is configured to transmit light along the Z-axis and towards a target plane, lying in a (U,V)-plane, wherein the (U,V)-plane is parallel to the (X,Y)-planes, such that the light in the target plane is distributed asymmetrically along the V-axis and symmetrically along the U-axis, the light distribution having a peak intensity and two wings extending from the peak intensity and perpendicularly to each other.

4. The asymmetric illumination lens according to any of the preceding items, wherein the at least one outer surface in the (X,Y)-planes is asymmetric along the Y-axis and symmetric along the X-axis.

5. The asymmetric illumination lens according to any of the preceding items, wherein the at least one outer closed curve is defined as a heart curve.

6. The asymmetric illumination lens according to any of the preceding items, wherein the asymmetric lens has an outer top point defined as Xo, Yo and Zo, wherein a distance from the bottom of the asymmetric lens to the top point is more than 5 mm, or such as more than 10 mm, or such as more than 15 mm, such as around 16 mm, such as around 17 mm, such as around 18 mm, such as around 19 mm, such as around 20 mm.

7. The asymmetric illumination lens according to any of the preceding items, wherein a distance from (Xc, Yc) to (X1, X1) in the (X,Y)-plane is more than 15 mm, or such as more than 20 mm, such as around 21 mm, such as around 22 mm, such as around 23 mm, such as around 24 mm, or such as around 25 mm.

8. The asymmetric illumination lens according to any of the preceding items, wherein a distance from (Xc, Yc) to (X2, Y2) and/or (X3, Y3) in the (X,Y)-plane is more than 5 mm, or such as more than 8 mm, such as around 9 mm, such as around 10 mm, such as around 11 mm, such as around 12 mm or such as around 13 mm.

9. The asymmetric illumination lens according to any of the preceding items, wherein the inner surface defines varying inner closed curves in the (X,Y)-planes along the negative Z-axis, wherein at least one of said inner curves is defined as being symmetric along the X-axis and along the Y-axis.

10. The asymmetric illumination lens according to any of the preceding items, wherein the inner surface is concave as seen from a direction along the positive Z-axis.

12. The asymmetric illumination lens according to item 11, wherein the concave surface comprising a base diameter of more than 2 cm, such as around 2.5 cm, such as around 2.6 cm, such as around 2.7 cm, such as around 2.8 cm, such as around 2.9 cm or such as around 3.0 cm.

13. The asymmetric illumination lens according to any of the preceding items, wherein the asymmetric lens has an outer top point defined as Xo, Yo and Zo, and wherein the inner surface comprises an inner top point defined by Xi, Yi and Zi, wherein Yi is different from Yo.

14. The asymmetric illumination lens according to item any of the preceding, wherein the illumination lens comprises a flange adapted to be attached with an O-ring, the flange having an inner diameter being more than 2 cm, such as around 2.5 cm, such as around 2.6 cm, such as around 2.7 cm, such as around 2.8 cm, such as around 2.9 cm or such as around 3.0 cm.

15. The asymmetric illumination lens according to any of the preceding items, wherein the inner surface is configured to receive light from a light source transmitting light along the positive Z-axis, and wherein the outer surface is configured to transmit light having propagated from the light source to the inner surface and further to the outer surface.

16. An illumination system for illuminating a stadium play field, comprising:
a plurality of lenses, wherein at least a part of said plurality of lenses is a lens according to item 1,
wherein each of the plurality of lenses is covering one light emitting diode or a plurality of light emitting diodes.

17. The illumination system according to item 16, wherein the plurality of lenses is an array of more than 5×5 lenses, such as more than 10×10 lenses, such as more than 14×14 lenses, such as more than 14×20 lenses, such as 14×25 lenses.

18. The illumination system according to any of the items 16-17, wherein each of the plurality of lenses is a lens according to item 1.

19. The illumination system according to any of the items 16-18, wherein the plurality of light emitting diodes covered by each of the lenses is in the form of a single chip-on-board device.

20. The illumination system according to any of the items 16-19, wherein said light emitting diode(s) covered by each of the lenses is/are connected to electronic wiring embedded in an electronically insulating layer, such as silicone.

21. The illumination system according to item 20, wherein said light emitting diode(s) covered by each of the lenses is attached to a heat sink via a holder.

22. The illumination system according to items 20 and 21, wherein each of said lenses is mounted on top of the electronic-insulating layer with an O-ring between each of said lenses and the electronic-insulating layer, the O-ring having an inner diameter being greater than an outer dimension of the holder.

23. The illumination system according to item 21, wherein the holder is black for reducing light pollution.

24. The illumination system according to any of the items 16-23, wherein the illumination system is mounted to a pole, the pole being more than 10 meters.

25. The illumination system according to any of the items 15-23, wherein the illumination system is mounted to a pole, such that all of the lenses and their respective (X,Y)-planes are angled with an angle of around 45 degrees relative to the plane of the stadium play field, whereby the stadium play field defines a lateral axis and a longitudinal axis, such that the stadium play field is illuminated with light along the lateral axis and along the longitudinal axis, the lateral axis being a linear projection of the Y-axis of the lens, and the longitudinal axis corresponding to the X-axis of the lens such that all of the light is distributed further along the lateral axis than along the longitudinal axis.

26. An illumination setup comprising at least two illumination systems, each illuminating a stadium play field, such that the at least two illumination systems are placed to face each other on two opposite sides of the stadium play field, such that the light from the at least two illumination systems overlap and form a rectangular area on the stadium play field, wherein the rectangular area has its smallest dimension along said two sides of the stadium play field.

27. The illumination setup according item 26, further comprising an array of LED light sources, and an array of asymmetric lenses above the LED light sources, wherein the lenses are symmetric in a first plane and asymmetric in a second plane, wherein the second plane is perpendicular to the first plane.

28. The illumination setup according to item 27, wherein the first and second planes are perpendicular to a plane defined by the array of LED light sources.

29. The illumination setup according item 26, wherein said illumination systems are illumination system(s) according to item 16.

30. Use of an asymmetric illumination lens according to item 1 for illuminating a stadium play field.

The invention claimed is:

1. An asymmetric illumination lens, comprising:
an inner surface and an outer surface, wherein the outer surface is defined by an X-axis, a Y-axis and a positive Z-axis according to a right-handed Cartesian coordinate system, wherein the X-axis and the Y-axis defines varying outer closed curves in (X,Y)-planes along the positive Z-axis, wherein at least one of said closed curves is defined by:
a critical point on the at least one closed curved having an X-value and a Y-value, defined as (Xc,Yc),
a first point on the at least one closed curve having an X-value and a Y-value, defined as (X1,Y1), the first point having a first tangent parallel to the X-axis and/or a line intersecting the first point and being parallel to the first X-axis, Y1 having a lower value than Yc;
a second point on the at least one closed curve having an X-value and a Y-value, defined as (X2,Y2), the second point having a second tangent parallel to the X-axis, Y2 having a higher value than Yc, and X2 having a value lower than Xc, such that a first line between the critical point and the second point has a negative slope; and
a third point on the at least one closed curve having an X-value and a Y-value, defined as (X3,Y3), the third point having a third tangent parallel to the X-axis, Y3 having a higher value than Yc, and X3 having a value larger than Xc, such that a second line between the critical point and the third point has a positive slope, and
wherein the first and second lines form an angle between said lines, the angle being less than 150 degrees, and/or
wherein an intersection line being parallel to the X-axis and through the critical point, splits the total area of the closed outer curve into three sub-areas: a first sub-area below the intersection line, a second sub-area and a third sub-area above the intersection line, such that the second sub-area and the third sub-area together define more than 5 percent of the total area.

2. The asymmetric illumination lens according to claim 1, wherein the angle is less than 140 degrees, or less than 130 degrees, or less than 120 degrees.

3. The asymmetric illumination lens according to claim 1, wherein the second sub-area and the third sub-area together define more than 10 percent of the total area or more than 15 percent of the total area.

4. The asymmetric illumination lens according to claim 1, wherein the outer surface is configured to transmit light along the Z-axis and towards a target plane, lying in a (U,V)-plane, wherein the (U,V)-plane is parallel to the (X,Y)-planes, such that the light in the target plane is distributed asymmetrically along the V-axis and symmetrically along the U-axis, the light distribution having a peak intensity and two wings extending from the peak intensity and perpendicularly to each other.

5. The asymmetric illumination lens according to claim 1, wherein the at least one outer surface in the (X,Y)-planes is asymmetric along the Y-axis and symmetric along the X-axis.

6. The asymmetric illumination lens according to claim 1, wherein the at least one outer closed curve is defined as a heart curve.

7. The asymmetric illumination lens according to claim 1, wherein the asymmetric lens has an outer top point defined as Xo, Yo and Zo, wherein a distance from the bottom of the asymmetric lens to the top point is more than 5 mm, or more than 10 mm, or more than 15 mm, or around 16 mm, or around 17 mm, or around 18 mm, or around 19 mm, or around 20 mm.

8. The asymmetric illumination lens according to claim 1, wherein a distance from (Xc, Yc) to (X1, X1) in the (X,Y)-plane is more than 15 mm, or more than 20 mm, or around 21 mm, or around 22 mm, or around 23 mm, or around 24 mm, or around 25 mm.

9. The asymmetric illumination lens according to claim 1, wherein a distance from (Xc, Yc) to (X2, Y2) and/or (X3, Y3) in the (X,Y)-plane is more than 5 mm, or more than 8 mm, or around 9 mm, or around 10 mm, or around 11 mm, or around 12 mm or around 13 mm.

10. The asymmetric illumination lens according to claim 1, wherein the inner surface defines varying inner closed curves in the (X,Y)-planes along the negative Z-axis, wherein at least one of said inner curves is defined as being symmetric along the X-axis and along the Y-axis.

11. The asymmetric illumination lens according to claim 1, wherein the inner surface is concave as seen from a direction along the positive Z-axis.

12. The asymmetric illumination lens according to claim 1, wherein the asymmetric lens has an outer top point defined as Xo, Yo and Zo, and wherein the inner surface comprises an inner top point defined by Xi, Yi and Zi, wherein Yi is different from Yo.

13. The asymmetric illumination lens according to claim 1, wherein the inner surface is configured to receive light from a light source transmitting light along the positive Z-axis, and wherein the outer surface is configured to transmit light having propagated from the light source to the inner surface and further to the outer surface.

14. An illumination system for illuminating a stadium play field, comprising:
a plurality of lenses, wherein at least a part of said plurality of lenses is an asymmetric illumination lens according to claim 1,
wherein each of the plurality of lenses is covering one light emitting diode or a plurality of light emitting diodes.

15. The illumination system according to claim 14, wherein the plurality of lenses is an array of more than 5×5 lenses, or more than 10×10 lenses, or more than 14×14 lenses, or more than 14×20 lenses, or 14×25 lenses.

16. The illumination system according to claim 14, wherein each of said lenses is mounted on top of an electronic-insulating layer with an O-ring between each of said lenses and the electronic-insulating layer, the O-ring having an inner diameter which is greater than an outer dimension of the holder.

17. The illumination system according to claim 14, wherein the illumination system is mounted to a pole, such that all of the lenses and their respective (X,Y)-planes are angled with an angle of around 45 degrees relative to the plane of the stadium play field, whereby the stadium play field defines a lateral axis and a longitudinal axis, such that the stadium play field is illuminated with light along the lateral axis and along the longitudinal axis, the lateral axis being a linear projection of the Y-axis of the lens, and the longitudinal axis corresponding to the X-axis of the lens such that all of the light is distributed further along the lateral axis than along the longitudinal axis.

18. An illumination setup comprising at least two of the illumination systems of claim 14, each illuminating a stadium play field, such that the at least two illumination systems are placed to face each other on two opposite sides of the stadium play field, such that the light from the at least two illumination systems overlap and form a rectangular area on the stadium play field, wherein the rectangular area has its smallest dimension along said two sides of the stadium play field.

19. The illumination setup according claim 18, further comprising an array of LED light sources, and an array of asymmetric lenses above the LED light sources, wherein the lenses are symmetric in a first plane and asymmetric in a second plane, wherein the second plane is perpendicular to the first plane.

20. The illumination setup according to claim 19, wherein the first and second planes are perpendicular to a plane defined by the array of LED light sources.

* * * * *